S. P. GODDARD
Steam-Plow.

No. 198,601.   Patented Dec. 25, 1877.

Witnesses:
John Donoghue
E. H. Bradford

Inventor:
S. P. Goddard
By H. J. Ennis
  att'y

UNITED STATES PATENT OFFICE.

SEXTUS P. GODDARD, OF WORCESTER, MASSACHUSETTS.

IMPROVEMENT IN STEAM-PLOWS.

Specification forming part of Letters Patent No. 198,601, dated December 25, 1877; application filed December 17, 1877.

*To all whom it may concern:*

Be it known that I, SEXTUS P. GODDARD, of Worcester, in the county of Worcester and State of Massachusetts, have invented certain new and useful Improvements in Steam Plows and Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to that class of agricultural machines operated by steam for breaking or cultivating the ground; and consists in the improved construction of the same hereinafter more fully described, and particularly pointed out in the claims.

Figure 1:
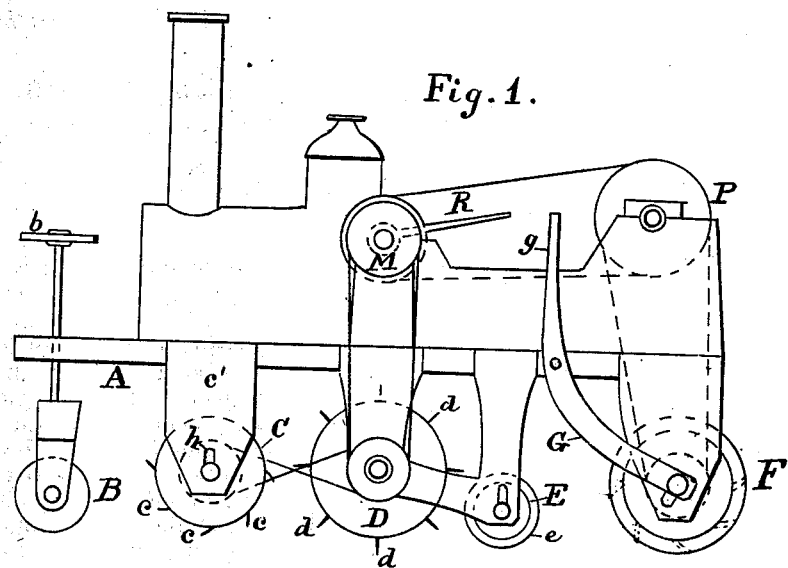
Figure 2:
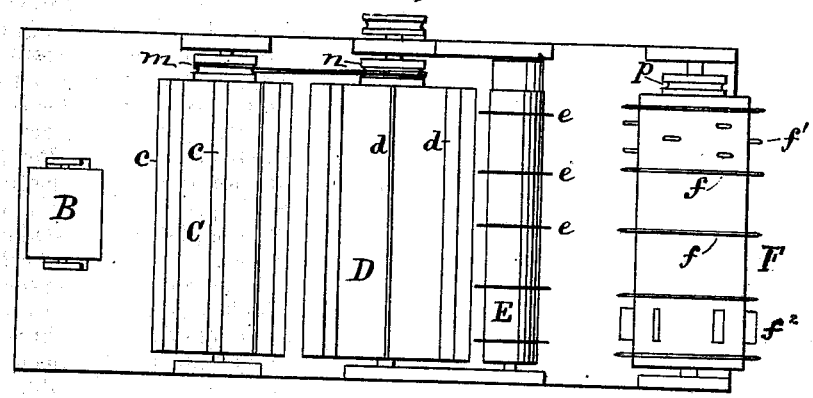

Figure 1 is a side elevation, and Fig. 2 a bottom-plan view, of the invention.

A is the platform, supporting an engine and boiler of ordinary construction. B is a swivel guiding-roller, provided with a steering-wheel, $b$, above the platform. C is a roller, provided with a series of curved blades or teeth, $c$, extending parallel to its axis. It is further provided with pulley $m$, through which means it gets its motion, which is communicated to it by a belt, or any suitable means. From the shape of the teeth $c$ on the roller C it is intended to have a motion opposite to the path of the machine. The roller C is hung in bearings in the hangers $c'$ on each side of the platform A. The said hangers have slots $h$, which admit of vertical adjustment of the roller C. D is the main driving-roller, and is provided with radial parallel knives $d$, which serve the double purpose of giving the machine a firm hold upon the ground, and, by the depression of the knives into the ground, to cut it in parallels running at a right angle to the path of the machine. Following this is a smaller roller, E, provided with a series of circumferential knives, $e$, which, being impressed into the ground, cut it into sods or squares in connection with the action of the roller D. Following this roller E is a larger one, F, provided, as the roller E is, with a set of circular knives, $f$, and between each set of knives is a series of curved rake or cultivator teeth, $f^1$ being one style and $f^2$ a different one, no particular style being claimed. These teeth $f^1$ and $f^2$ are a trifle shorter than the knives $f$, so that in passing over rocks or hard obstructions, the knives being longer than the teeth, the former ride over and act as guards for the latter, making it impossible for them to be injured. This roller is driven direct by the engine by the pulley P, connected direct, and thence through a belt to the pulley $p$; but the pulley M, which drives the roller D, has a clutch or stop motion, which is thrown in and out of gear by the lever R.

It will, therefore, be seen that the machine may be stopped by throwing the lever R out of gear while the engine is running, which will cause the machine to stop, while the roller F, being connected direct to the engine, will continue revolving, in order to thoroughly cut up any hard patches of ground that are being worked upon. This roller F is provided with means for vertical adjustment through the levers G, provided with handles $g$, extending above the platform A, said roller being usually raised while going to and returning from work. The adjustment also serves to vary the depth at which it is desired to work the ground.

The operation of the invention is as follows: The machine having been started, the roller C being set to a suitable height above the ground, any small rough or raised points being leveled by it, the main driver D, in passing over the ground, cuts it into parallels across the path of the machine. Immediately following this is the smaller roller E with its circular knives $e$, which cut the ground also in parallels, but at a right angle to the former ones. Lastly, comes the roller F, the knives of which follow into the cuts made by the preceding ones, the teeth $f^1$ and $f^2$ turning or tearing the ground, thus leaving it in a uniform cultivated state.

Having thus described my invention and its manner of operation, what I claim as new and useful, and desire to secure by Letters Patent, is—

1. In a machine of the class described, the roller F, provided with teeth $f^1$ and circumferential knives $f$, substantially as shown, and for the purpose set forth.

2. In a machine of the class described, the roller D, provided with a series of knives, $d$, placed upon its circumference, and running parallel to its axis, in combination with the roller F, provided with teeth $f^1$ and circumferential knives $f$, substantially as shown, and for the purpose specified.

3. In a machine of the class described, the leveling-roller C, provided with curved knives $c$, in combination, the roller D, provided with its knives $d$, and the roller E, having circular knives, substantially as shown, and for the purpose set forth.

4. The combination of the roller C, having leveling-knives, the main driver D, having knives $d$, the roller E, having its circular knives, and the roller F, provided with circular knives or guards $f$ and the rake-teeth $f^1$, substantially as shown, and for the purpose set forth.

In testimony that I claim the foregoing as my own I hereby affix my signature in presence of two witnesses.

SEXTUS P. GODDARD.

Witnesses:
JOHN O'DONNOGHUE,
THEO. MUNGEN.